March 29, 1955 P. SCHLUMBOHM 2,705,086
BEVERAGE DISPENSER WITH HEAT-INSULATING HANDLE
Filed Feb. 9, 1953
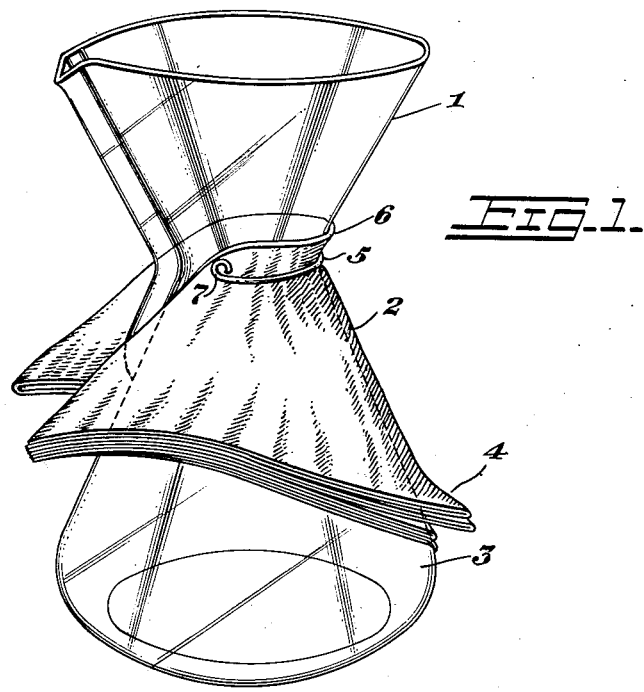
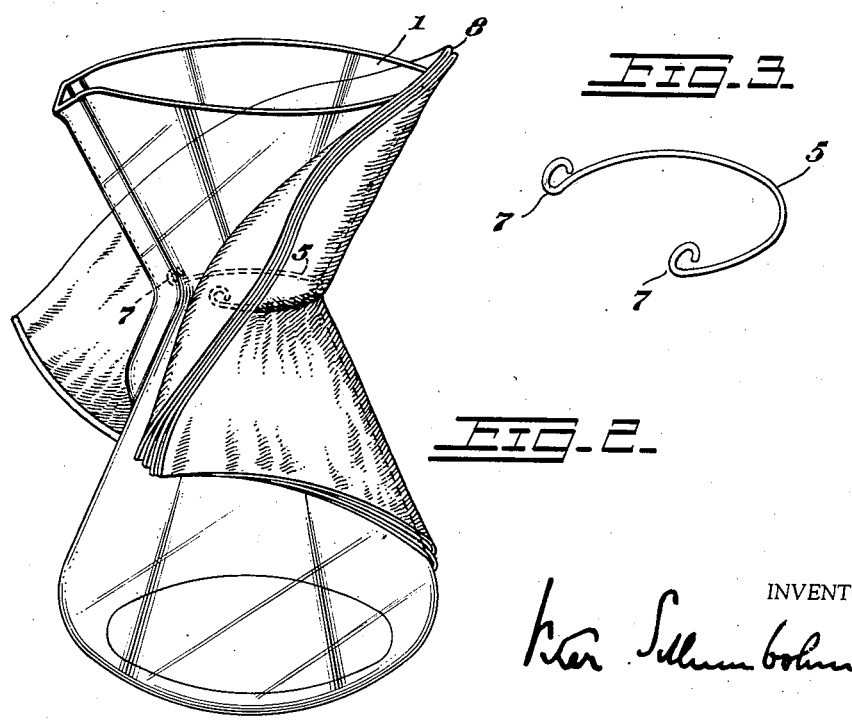
INVENTOR

United States Patent Office 2,705,086
Patented Mar. 29, 1955

2,705,086

BEVERAGE DISPENSER WITH HEAT-INSULATING HANDLE

Peter Schlumbohm, New York, N. Y.

Application February 9, 1953, Serial No. 335,824

5 Claims. (Cl. 215—101)

The present invention refers to a beverage dispenser with a heat insulating handle, especially a coffeemaker or teamaker. More specifically, the invention refers to an hourglass-shaped coffeemaker which I manufacture under the trade-mark "Chemex."

The invention is illustrated in the accompanying drawings Figure 1 to Figure 3. Figure 1 shows a side view of the coffeemaker with the new handle attached but only partly arranged. Figure 2 shows a detail, a horseshoe-shaped spring clip required for applying the handle. Figure 3 shows the coffeemaker in a perspective view with the handle completely attached and arranged.

Following the invention, a tight-fitting handle for the coffeemaker can be formed in the following manner: a standard luncheon napkin—for instance, of 18" x 18"—which after having been laundered and ironed has the shape of a square of 9 x 9" forming four layers, is folded over to form a tricorne having eight layers and having two short sides of 9" each and the longer hypotenuse.

As shown in Figure 1 this tricorne 2 is arranged on the wall of the lower section 3 of the hourglass-shaped coffeemaker 1 with its tip 4 down and with a spring clip 5 pressing the material 6 of the hypotenuse section of the tricorne into the neck zone of the coffeemaker.

Figure 2 shows a view of the horseshoe-shaped spring clip 5. This spring clip comprises at each end an upward bent section 7 and 7', which forms an eyelet-shaped glider tip.

Figure 3 shows the result of pulling the upper half of the tip section 4 upward into position 8.

As a surprising effect, a snugly-fitting handle is created which conforms with its own double cone shape to the double cone contours of the coffeemaker.

The result is a handle of heat insulating material which allows the hand to grip firmly the neck section of the coffeemaker and which protects the entire surface of the hand which is in contact with the coffeemaker.

This result is due to the cooperation between the shape of the walls of the coffeemaker, the shape of the napkin, and the fixating action of the spring clip.

Figure 1 makes it clear that that part 6 of the tricorne material which is held above the spring clip 5 is excluded from the material which finally forms the double cone contour. It is as if a skillful tailor had "taken in" with great skill just that part of the total material which would disturb the formation of a double cone contour.

The square piece of material which is required as a pre-step to forming the tricorne, must not necessarily comprise four layers, as in the cited example of a folded luncheon napkin. A one-layer square piece of material, for instance, of 9" x 9" could be treated in the same manner. The main point is that the tricorne has at least two layers of which one remains to cover the lower part of the hourglass-shaped coffeemaker while the other layer is pulled upward to cover the upper section of the coffeemaker.

The eyelet-shaped tips 7 and 7' of the spring clip have not only the effect of preventing a tearing of the material but they also become pivots for the thumb and the middle finger of the gripping hand.

I claim as my invention:

1. Heat-insulating handle for a beverage dispenser, especially coffeemaker, having side walls, bottom walls, and an open top, of the type in which said side walls are contoured like two truncated cones joined with their apexes, and in which this zone of the two adjoining apexes forms a neck zone of smallest diameter of said side walls, said heat-insulating handle being a de-formable sheet element such as cloth, arranged as a structure of at least two folded lavers and being a right triangle in its plane surface, including a hypotenuse folded side edge, said structure being tied by binding means to said side walls with said hypotenuse side edge extending above the binding means and circumferentially around the side walls in said neck zone.

2. Heat-insulating handle as claimed in claim 1, in which said handle structure is tied to said side walls by binding means which grip all layers adjacent to the hypotenusal edge of said structure.

3. Heat-insulating handle as claimed in claim 1, in which the layers of said multi-layer structure are separated on the off-side of the binding means, one or more layers pointing downward, hugging the side walls of the lower truncated cone, and one or two layers pointing upward, hugging the side walls of said upper truncated cone.

4. Heat-insulating handle as claimed in claim 1, in which said binding means consist of a horseshoe-shaped spring clip having a diameter slightly larger than the diameter of said side walls in said neck zone.

5. Heat-insulating handle as claimed in claim 1, in which said binding means consist of a horseshoe-shaped spring clip having a diameter slightly larger than the diameter of said side walls in said neck zone, and in which the free ends of said horseshoe are bent into eyelets, the plane of each eyelet being approximately 90° away from the plane of the horseshoe.

References Cited in the file of this patent

UNITED STATES PATENTS

| 2,154,772 | Rathemacher | Apr. 18, 1939 |

FOREIGN PATENTS

| 17,694 | Great Britain | of 1904 |
| 61,883 | Germany | Aug. 20, 1912 |
| 233,818 | Switzerland | Nov. 16, 1944 |